Aug. 5, 1947.  A. M. KIVARI  2,425,065
METHOD OF SEPARATING FLOCCULATABLE AND GRITTY SOLIDS FROM LIQUIDS
Filed July 21, 1943  4 Sheets-Sheet 1

INVENTOR.
ARTHUR M. KIVARI,
BY
ATTORNEY

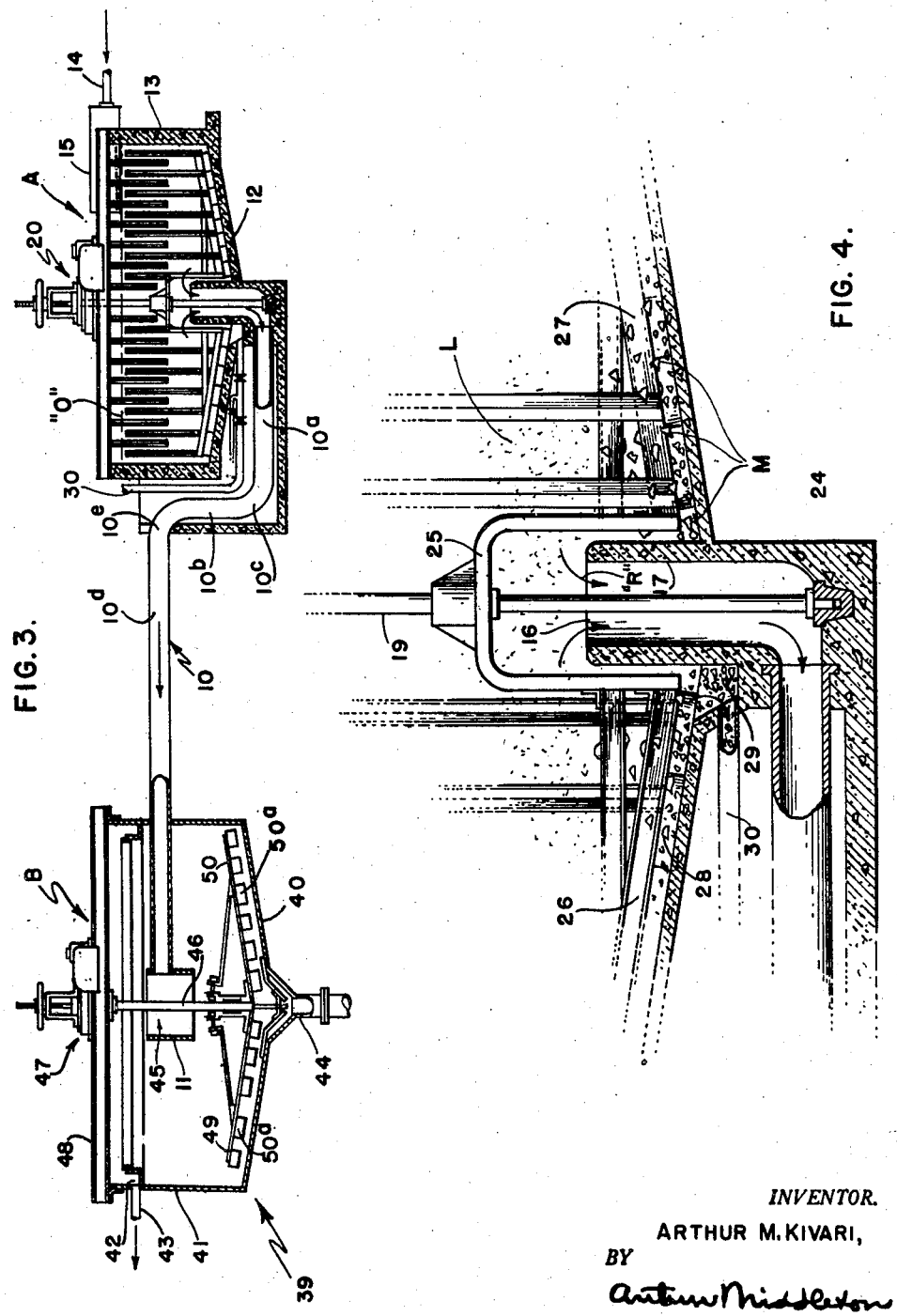

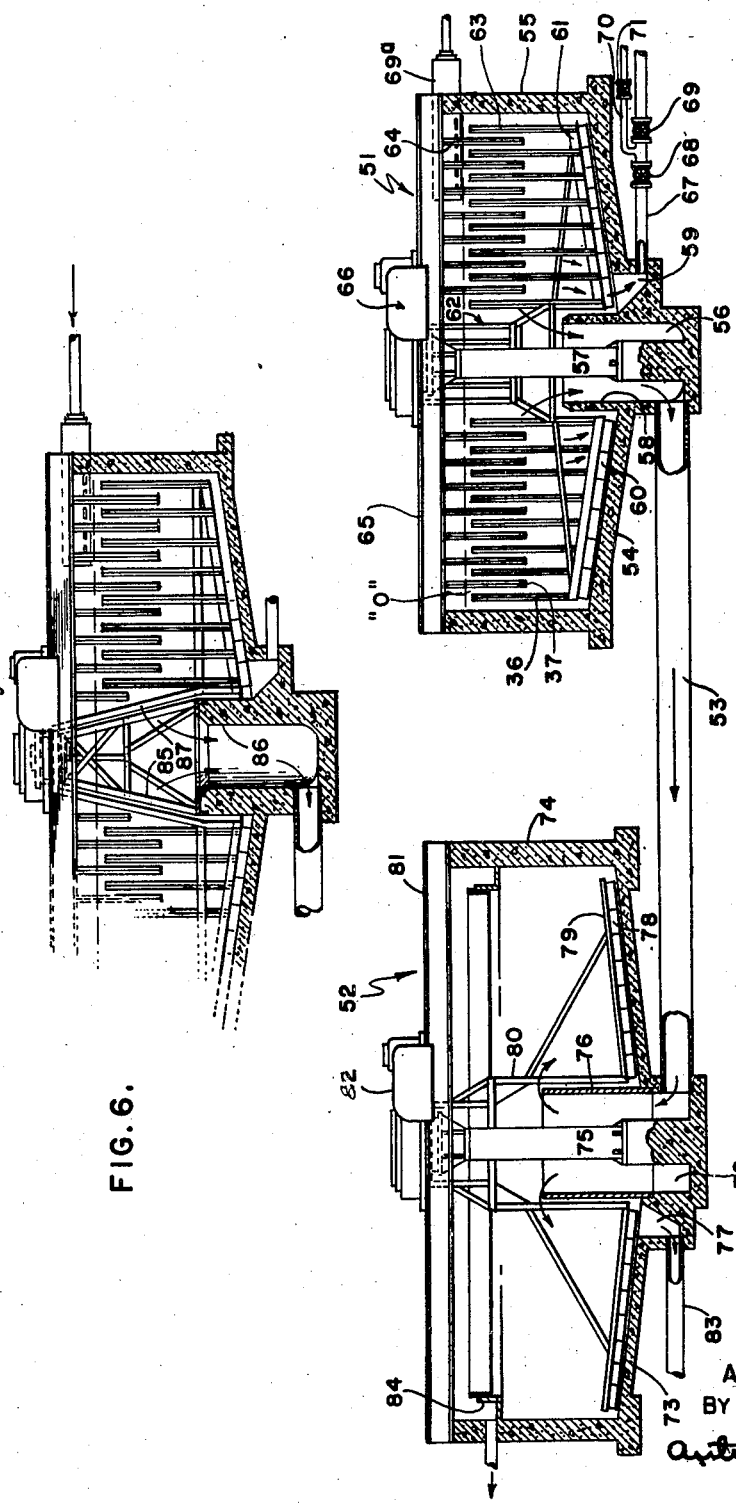

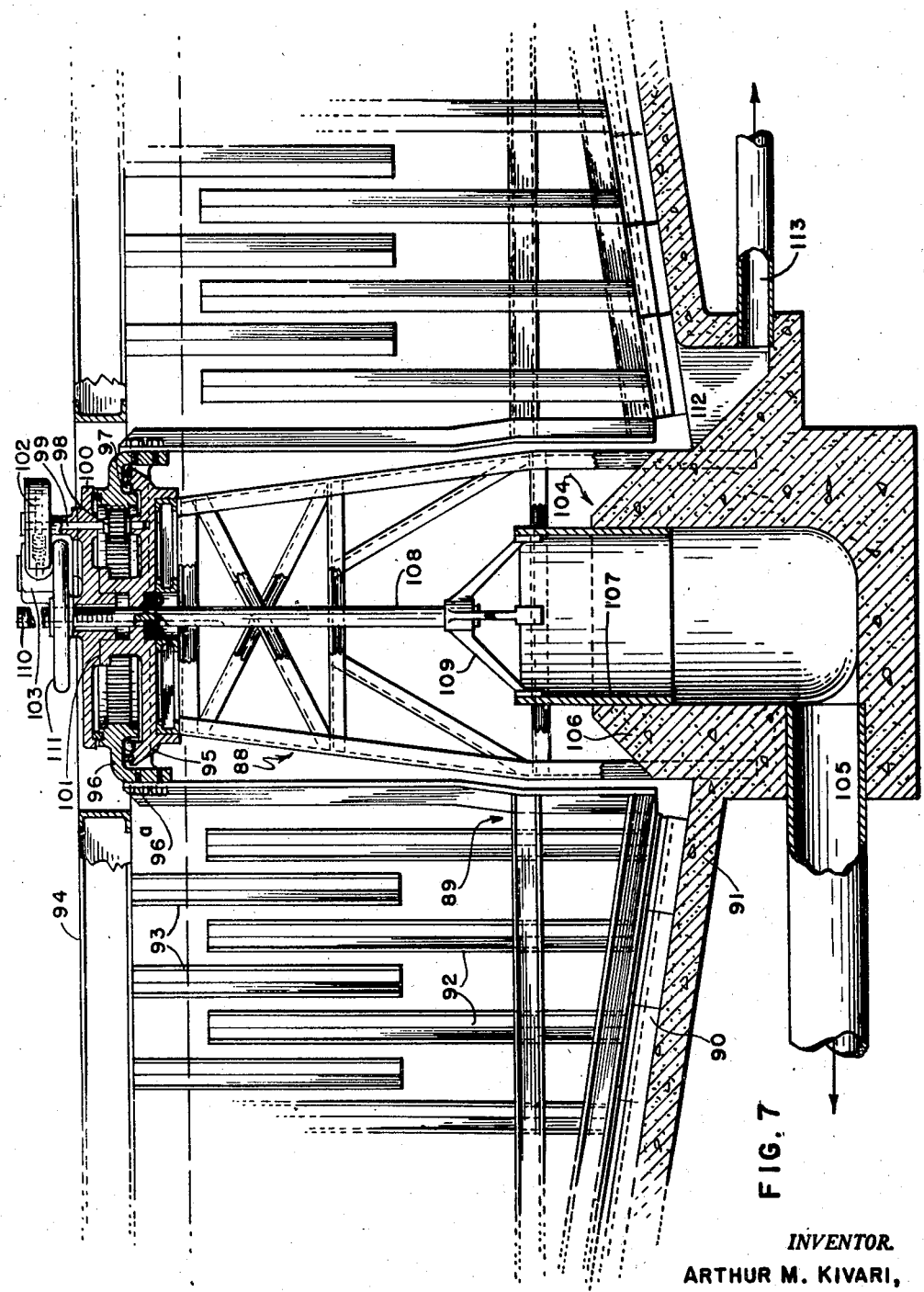

Patented Aug. 5, 1947

2,425,065

UNITED STATES PATENT OFFICE 2,425,065

METHOD OF SEPARATING FLOCCULATABLE AND GRITTY SOLIDS FROM LIQUIDS

Arthur M. Kivari, Los Angeles, Calif., assignor to The Dorr Company, New York, N. Y., a corporation of Delaware Application July 21, 1943, Serial No. 495,576

2 Claims. (Cl. 210—16)

This invention relates to the treatment of solids-bearing liquids, and more specifically to treatment that will effect the separation of the solids from the liquid by way of sedimentation operation. This involves those liquid-solids mixtures in which one component portion of the solids, namely segregating or fast settling solids, such as grit, metallics, residues from dosing chemicals or reaction products, unburned cores, crystals, may interfere with the treatment or recovery of, or the elimination of lighter or flocculent solids fraction from the liquid.

It should be understood that the solids in a mixture of the kind herein contemplated, comprise those of a segregating, fast-settling, or gritty nature, as well as those that are non-segregating, non-gritty, slow-settling, flocculent, or flocculatable. Flocculatable solids may include those that are substantially non-settleable, but may be rendered settleable by carefully controlled flocculation treatment involving agitation, whereby the fine and light non-settleables are coalesced or coagmented into flocs capable of sedimentation. Thus the purpose of flocculation treatment is to consolidate relatively non-settleable suspended matter into settleable clusters or flocs. In some instances it may be desirable to dose a solids-bearing raw liquid with a chemical in order to effect the initial coagulation of non-settleable matter which is then further formed into suitable flocs by the controlled agitation treatment.

Because of the character of the structure and behavior of the flocs thus formed, it is important that the further handling or flowing of the floc-carrying liquid be sufficiently gentle, and that the flow rate in conducting it away from the flocculation unit into a settling space be sufficiently low to avoid injury, breakage or disintegration of the flocs into its non-settleable component parts.

In view of the sedimentation and other characteristics of the non-gritty or flocculent matter, it is desirable to have the gritty matter kept out of, or removed from, a floc-bearing liquid that is in a state of transit. Operating difficulties are likely to arise in a conduit carrying flocculated liquid at a flow rate low enough to prevent injury to the structure of the floc, inasmuch as that flow rate would be too low to prevent settling out of the gritty matter in the conduit and consequent gradual blockage of the flow passage thereby. On the other hand, a flow rate high enough to carry the grit would be injurious to the flocs. This makes it desirable to abstract both kinds of solids from the liquid as fractions, namely first the gritty and then the non-gritty fraction. However, depending upon the kind of technical operation involved, the purpose of such fractionate withdrawal of the gritty and the non-gritty solids may vary. It may be to clarify and purify the liquid as such and in such a manner that the treatment and separation of the non-gritty solids is not interfered with by the presence of the gritty matter; or it may be to recover from the liquid and utilize either one or the other of the fractions per se, or indeed to utilize both of them even though separately.

Thus, the application of this problem (the fractionate removal of gritty and non-gritty or flocculent matter from a liquid) is diversified, and may be encountered in a multiplicity of arts, technical fields, and treatment processes, a number of which are represented in:

(a) The treatment of raw sewage,
(b) The softening of hard water,
(c) The treatment of sea water for the recovery of magnesium,
(d) The recovery of flue dust from blast furnaces, and the environment of which will be more fully described.

Usually, a presedimentation or primary sedimentation step abstracts the fast settling or gritty portion from the liquid, allowing the slow settling or flocculent or flocculatable portion to overflow. If desirable, the overflowing solids are conditioned by flocculation and the floc-bearing liquid submitted to a step of secondary sedimentation to abstract the non-gritty flocculated matter from the liquid.

One broad object of this invention is to effectively and economically provide means for removing from a liquid a gritty fraction and a non-gritty or flocculent fraction of the solids.

Another object is to effectively combine the primary sedimentation and flocculation step in one economical treatment unit whereby the liquid is simultaneously flocculated and de-gritted, occupying a minimum of space.

Another object is to provide an efficient supplemental treatment unit that is operatively adaptable to an existing clarifier in such a manner that the combination will lend itself to the kind of treatment involving the fractionate removal from the liquid of the gritty and the non-gritty flocculatable matter, such as above outlined.

Another object is to provide for the purpose herein set forth a comparatively cheap installation for relatively large flows.

Still another object is to provide a treatment unit for the removal of gritty matter from a mixture comprising liquid, grit, and non-gritty matter. For instance, as applied to the treatment of raw sewage, this involves the removal of the detritus from the sewage liquid while organic and putrescible matter remains in suspension in the effluent from this unit for secondary sedimentation operation and subsequent biological treatment of the secondary settled sewage sludge.

These objects are attained by providing a tank unit through which the mixture containing the aforementioned different kinds of solids progresses in a general downward direction, as the grit settles on the bottom and the liquid carrying the non-gritty matter in suspension passes from the tank through a centrally disposed outlet in the bottom. Raking mechanism rotating about a central vertical axis conveys the settled grit over the tank bottom into a collecting zone or annular pocket surrounding the liquid outlet and functionally separated therefrom. This zone of grit collection and withdrawal is functionally separated from the liquid outlet by the pocket or by a submerged cylindrical portion surrounding the outlet and rising from the bottom. The liquid carrying the non-gritty remaining matter passes on through the outlet to a further treatment step, for instance to another or secondary settling operation whereby the non-gritty matter is deposited as sludge. Depending upon whether the character of the suspended non-gritty matter requires it, flocculating agitating means are provided in the de-gritting tank unit.

According to one feature, the grit is raked towards the center of the tank and collected in an annular zone substantially adjacent to the outlet for the liquid.

According to another feature, flocculating means are associated with the raking means, and comprise upstanding vertical baffle members rotating together with the raking means, and corresponding depending stationary baffle members cooperative with the upstanding members in producing the flocculation effect upon the suspended solids.

It is among the advantages of this invention that where a settling tank is already installed and available, a unit for de-gritting and flocculation such as herein disclosed can be installed ahead of the existing tank. In this way an existing installation can be expanded economically into a plant of ample capacity and adapted to serve the particular purpose herein proposed.

According to still another feature, a combination of a primary tank and a secondary bottom-fed settling tank or other bottom-fed solids separating device has a bottom to bottom liquid transfer conduit whereby the flocculated liquid from the first tank is passed underneath and to the second tank and then along the shortest route and with the least possible deviations.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Figure 1:
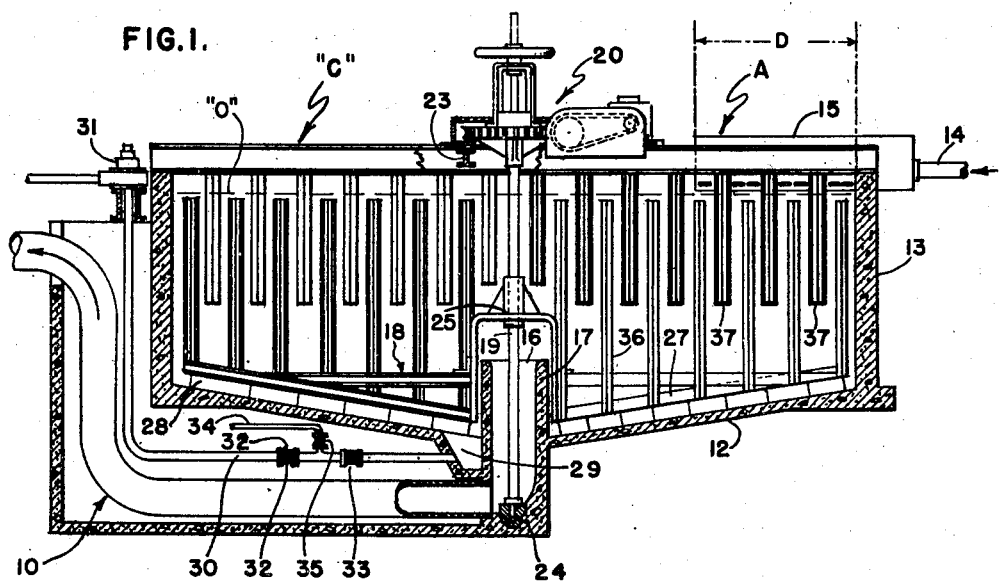
Figure 1 is a sectional view of the unit combining degritting and flocculation.

Fig. 3 in a reduced scale shows the primary treatment unit of Fig. 1 in series with a secondary treatment unit or settling tank for effecting the removal of the non-gritty matter from the liquid.

Fig. 4 is an enlarged detailed view showing the central bottom portion of the tank unit of Fig. 1, including the zone of grit collection and removal, and the outlet for the floc-carrying effluent surrounded by the grit collecting zone, as well as means such as an annular submerged weir, whereby the annular grit collecting zone is functionally separated from the effluent outlet.

Fig. 5 shows another structural embodiment of a combination of the primary and the secondary tank unit, with a pier-supported rotary raking mechanism in each unit, and a bottom to bottom liquid transfer conduit between the tanks.

Fig. 6 is a modified structural combination of a center pier construction with the bottom outlet means for the effluent carrying the non-segregating solids.

Fig. 7 shows a center pier type tank serving as the primary settling unit, with the addition of means for adjusting the weir height of the central bottom effluent outlet means.

The invention is herein shown to be embodied in an apparatus combination (see Fig. 3) which comprises a treatment tank unit 9 for degritting the solids-bearing liquid fed thereto, as well as for conditioning or flocculating the lighter suspended matter, and a sedimentation tank unit B in which the effluent from tank unit A is allowed to deposit the flocculated solids as sludge.

Figure 2:
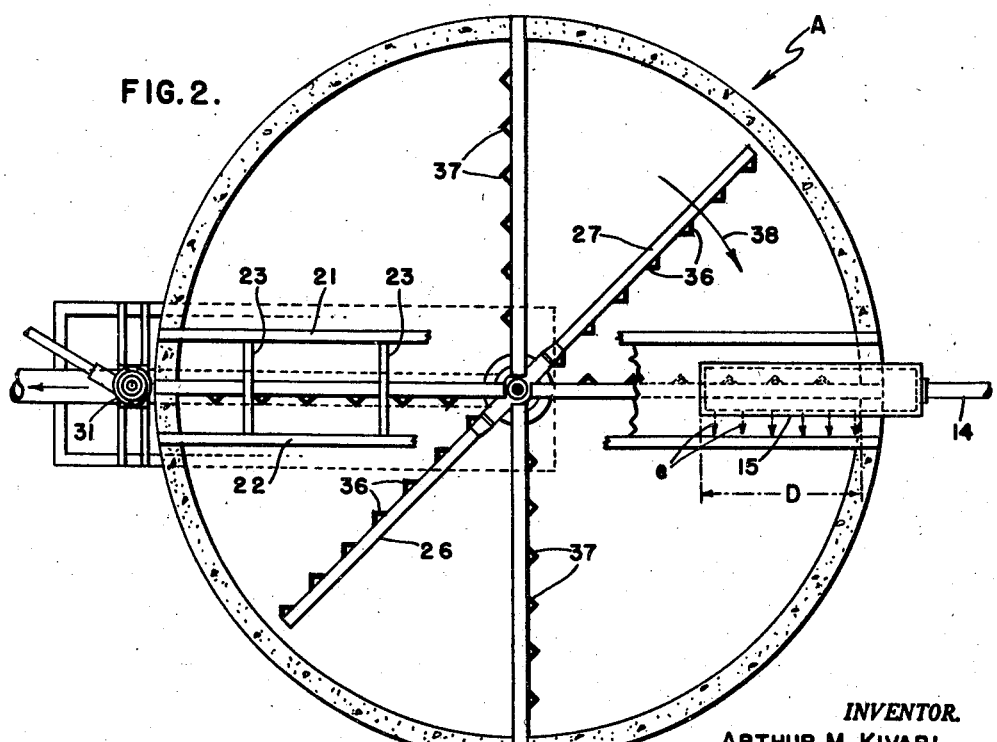
Fig. 2 is a plan view of the unit of Fig. 1.

The floc-carrying effluent passes through a conduit 10 from underneath the tank unit A to a centrally disposed feed well 11 in the tank unit B. Enlarged sectional and plan views of the novel tank unit A are shown in Figs. 1 and 2. This unit comprises a tank having a bottom portion 12 shown to be slightly conical, and a circular side wall 13 rising marginally from the bottom portion. Influent liquid enters the tank at the top by way of an inlet pipe 14 leading into a feed distributing launder or trough 15 extending radially of the tank and part way from the tank wall towards the center thereof for a distance D.

An effluent outlet 16 is provided centrally of the tank and leading downward through the bottom portion thereof and into the liquid transfer conduit 10. It is herein shown to comprise a vertical upwardly open tube portion 17 in effect constituting a circular submerged weir rising centrally from the bottom portion of the tank.

Since the tank unit A serves for the sedimentation and removal of grit in the liquid, there is provided a rotary sediment raking mechanism 18 which comprises a vertical rotary shaft 19 rotated by a power actuated drive mechanism 20 supported by and mounted upon a horizontally extending beam construction C comprising a pair of main beams 21 and 22 extending across the tank and endwise supported upon the tank wall at the top thereof. The main beams 21 and 22 are interconnected by a number of transverse beams 23. The drive mechanism 20 is too well known to require any detailed description. The vertical shaft 19 has a lower end thrust bearing 24 disposed within the effluent outlet portion or tube portion 17, and intermediate its ends the shaft has fixed thereto a spider construction 25 which surrounds the effluent portion 17, and has mounted thereon a pair of oppositely extending rake arms 26 and 27 provided with sediment engaging plowing blades 28 which engage the settled grit and convey it toward the center of the tank as the arms rotate. The gritty matter thus conveyed and collected into an annular zone surrounding the effluent portion 17, eventually drops into a sump 29 disposed within that zone and adjacent to the effluent portion 17.

A suction pipe 30 leading to a pump 31 draws the gritty matter or sludge from the sump 29. Shutoff valves 32 and 33 are provided in series in the suction pipe 30, which are normally open, but which can be closed alternately to flush out and clean corresponding portions of the suction pipe 30 by means of flushing water from a supply pipe 34 which in turn also has a shutoff valve 35 that is normally closed, but may be opened to admit flushing water to the suction pipe 30 when either the valve 32 or the valve 33 therein is closed.

Means for conditioning or flocculating the solids remaining in suspension in the liquid passing through tank unit A, are shown to be provided in association with the rotary raking mechanism above described. The flocculating means comprise a set of upstanding vertical baffle members 36 of V-shaped cross section fixedly attached to and rising from each rake arm 26 and 27 respectively. A corresponding set of vertical baffle members 37 which are stationary, have their upper ends fixed to the overhead supporting structure comprising the main beams 21 and 22, and they extend with their free ends downwardly into the tank and into functional interrelationship with the upstanding members 36. The stationary members 37 also are shown to be of V-shaped cross section. When the mechanism rotates in the direction of arrow 38, the movable vertical members 36 pass through the spaces between the stationary members 37 in such a manner that the apexes of the V-shapes of the movable and of the stationary vertical members respectively point towards each other.

Referring to Fig. 3, the liquid transfer conduit 10 is shown to comprise a horizontal portion 10ª extending underneath the tank unit A from the center to a point beyond the margin thereof, a vertical portion 10ᵇ rising outside the tank unit A and connected by a curved portion 10ᶜ with the horizontal portion 10ª, and another horizontally extending portion 10ᵈ connected with the vertical portion 10ᵇ by a curved portion 10ᵉ and leading through the side wall of tank unit B into the cylindrical feed well 11 thereof. The sedimentation tank unit B is otherwise shown to be of standard construction such as includes a tank 39 having a bottom portion 40 and a side wall 41, an annular overflow launder 42 with an effluent outlet pipe 43, a central sludge discharge pipe connection 44 leading from the center of the bottom.

Rotary sediment raking mechanism 45 of the tank unit B comprises a vertical rotary shaft 46 rotated by and suspended from a drive mechanism 47 supported by and mounted upon a horizontally extending beam construction 48 that is endwise supported by the wall of the tank at the top thereof. The lower end portion of the shaft 46 has fixed thereto radially extending rake arms 49 and 50 provided with sediment engaging blades 50ª which convey settled sludge over the tank bottom to and into the sludge discharge connection 44 when the rake arms 49 and 50 rotate.

Following is a description of the operation of the apparatus herein shown and described, and in particular the operation of the combination of tank units A and B shown in Fig. 3:

Liquid carrying in it and with it heterogeneous kinds of solids, such as a segregating and a non-segregating kind, enter the tank unit through the supply pipe 14 and the distributing launder 15 from which the mixture issues laterally into the tank proper. It is noted that the launder 15 extends horizontally and radially towards the center of the tank only for a distance D along which the feed liquid enters into the liquid body that fills the tank. By thus extending the feed launder only part way to the center of the tank, insurance is given that the liquid flowing from the launder and substantially tangentially into the liquid body in the tank (note the arrows e pointing in the direction of streams of feed liquid flowing from the launder) passes along a path of adequate length from the point of influent at the top to the effluent outlet at the center of the bottom.

The liquid maintained to a level 0 (see Figs. 1 and 3) passes from the top of the tank in a general downward direction towards central effluent outlet 16, although in somewhat spiralized paths around the central vertical axis of the tank. While thus in transit from inlet to exit, the gritty or segregating fraction of the solids settles from the body of the liquid to the bottom and is thus abstracted, while the lighter or non-segregating matter remains in suspension, to be flowed or to drift out of the tank with the liquid passing out through the effluent outlet 16.

With the liquid thus in transit through the tank, two phases of treatment take place simultaneously, namely, degritting and flocculation. That is to say, as the vertical shaft 19 rotates due to the operation of the drive mechanism 20, the sediment engaging blades 28 carry the sediment containing the grit gradually over the tank bottom to and into a collecting zone or annular pocket surrounding and adjacent to the effluent outlet or upright tube portion 17, where it is collected in the grit sump 29, to be withdrawn through the suction pipe 30 by the pump 31. While this grit sedimentation and removal takes place, the matter remaining in suspension in tank unit A is subjected to flocculation treatment produced in the liquid by the vertical baffle members 36 moving through the liquid body in repetitive circular paths and towards and past the stationary baffle members 37. The effect of this kind of agitation in producing flocculation of the non-segregating matter is similar to that produced by flocculating-agitating mechanism shown in the patent to Darby No. 2,274,361, issued December 21, 1939.

The enlarged detail Fig. 4 illustrates the manner in which the grit collecting zone is functionally separated from the effluent outlet. It shows how the particles M of segregating matter settling from the liquid are intercepted outside the circular submerged weir or effluent outlet tube portion 17, while the lighter matter or flocs L are carried over the edge of the weir or tube portion 17 and drift or flow downwardly out of the tank with the effluent liquid as indicated by arrows R. It is to be noted that the flocculated or floc-carrying liquid passes from the top and marginal portion of the liquid body towards the centrally disposed effluent outlet, at a gradually increasing speed due to the narrowing of the available flow cross-sections. This phenomenon in turns tends to carry the flocs more positively away from the settling or settled gritty matter, and thereby effects a cleaner separation or fractionation of the two kinds of solids.

Another operating advantage realizable by this flow principle is that a relatively clean separation or solids fractionation is attained in spite of relatively wide fluctuations in the rate of flow passing through the tank unit.

The floc-laden effluent liquid from the tank unit A passes through the liquid transfer conduit 10 into the feed well 11 of the tank unit B through which the liquid passes at a rate, and in which it is detained for a period of time, adequate to allow settling of the flocs or flocculated matter. Clarified liquid is thus allowed to overflow from the tank B as by way of the annular marginal overflow launder 42, while settled matter or flocs in the form of sludge is continually withdrawn through the centrally disposed discharge or withdrawal pipe 44 to which it is being continually conveyed by the rotating rake arms 49 and 50 and the sediment engaging blades 50ª thereon.

The embodiment of Fig. 5 comprises a combination of a primary tank 51 and a secondary tank 52, characterized by a bottom to bottom liquid transfer conduit 53. That is to say, the liquid carrying the non-segregating and flocculated matter passes downwardly out through the bottom of the first or primary tank through the horizontal transfer conduit 53 and through a bottom inlet into the secondary tank 52. The transfer of floc-carrying liquid is thus accomplished efficiently and along the shortest possible route and with the least possible deviations or changes of directions.

In the Fig. 5 embodiment, the primary tank 51 comprises a bottom portion 54, an upstanding wall portion 55, a centrally depressed portion 56 from the bottom of which rises a pier or column 57. The wall of the depressed portion 56 extends upwardly to a point above the bottom 54 so as to form the cylindrical submerged portion 58 through which effluent is downwardly withdrawn from this tank. Outside of and adjacent to the cylindrical portion 58 is a sump 59 to and into which gritty sediment is raked by blades 60 provided on radially extending rake arms 61 constituting part of a rotary structure 62 mounted in self-sustained fashion for rotation upon the pier 57.

This rotary structure 62 is further provided with upstanding vertical flocculating elements 63 similar to the elements 36 shown in Fig. 1. Stationary vertical companion elements 64 are provided similar to those shown at 37 in Fig. 1. A horizontal beam construction 65 mounted upon the top of the tank serves to support drive mechanism 66 as well as the depending flocculating elements 64. A sediment or grit withdrawal pipe is shown at 67, the wash water being controlled by means of a valve 71 and valves 68 and 69. A feed launder 69ª is shown to be similar in arrangement to the feed launder 15 in Figs. 1 and 2.

The horizontal liquid transfer pipe 53 leads from the under-side of tank 51 to the under-side of tank 52, namely, into the depressed portion 72 constituting a part of the bottom portion 73 of this tank which has an upstanding marginal wall portion 74. From the bottom of the depressed portion 72 rises a column or pier 75. A cylindrical feed inlet portion 76 continues upwardly from the depressed portion to a point above the bottom even though submerged. Outside of and adjacent the cylindrical inlet portion 76 there is provided a sump 77 to and into which sediment is conveyed over the tank bottom by raking blades 78 provided on rake arms 79 constituting part of a rotary structure 80 mounted in self-sustained fashion for rotation upon the top of the pier 75.

Horizontally extending beam structure 81 is mounted upon the top of the tank walls and serves to support driving mechanism 82 for the rotary structure. Means for withdrawing collected sediment or flocs in sludge form from the sump 77 are indicated by a withdrawal pipe 83 which may be connected to a sludge pump (not shown). An annular overflow launder for clarified liquid is shown at 84.

Fig. 6 represents a modified construction of the center portion of a tank that otherwise functions in the manner of the primary tank 51 shown in Fig. 5. This modified arrangement differs structurally from the Fig. 5 embodiment in that the center pier supporting the rotary raking and flocculating means, comprises a hollow cage-like steel structure 85 that is mounted upon and rises from the top edge portion of a cylindrical bottom effluent outlet portion 86. The parts of the rotary flocculating and raking structure are herein indicated at 87.

As to the various fields of application, some of which have been listed above under items (a), (b), (c) and (d), the operation of the improved degritting and flocculating unit as embodied in the primary tank, as well as its combination with a secondary solids separating unit or sedimentation tank, may be visualized as follows:

(a)' In the treatment of raw sewage the flow from the sewer could go directly into the primary tank or degritting and flocculating unit such as represented by the tank A in Fig. 3 or by the tank 51 in Fig. 5. The function of the primary tank would be degritting and preflocculation.

The grit or grit-containing sludge could be withdrawn with a suitable pump and discharged into a small classifier (not shown), for instance a classifier of the reciprocating type known as the Dorr classifier mounted at the top of the tank unit. The overflow from this classifier containing organic matter washed off the grit, would be allowed to flow back into the tank whence it came, while the washed sands or gritty matter would be discharged as rake product from the classifier for final disposal.

The washing of the grit might also be effected by means of an endless chain bucket-type classifier such as disclosed in Munro No. 2,106,156. In that instance (not shown) the grit would be raked toward the outer margin of the tank bottom to be collected in a marginally disposed sump whence it would be lifted to a point above the liquid level by the buckets of the endless chain, while a washing treatment of the grit could be combined with this lifting operation in the manner disclosed in the patent.

(b)' In the treatment of water, such as softening of hard water, the raw water would flow into the primary or flocculating unit at the top, while the softening materials were being added, for instance, in the feed launder 15 in Fig. 3 or 5, and a coagulating agent added further down into the tank after the softening reaction had taken place. The softening agent such as lime, may contain unburned cores and other undesirable gritty matter which would be removed in the primary or flocculating unit embodying the invention without requiring a separate degritting unit such as would be required in conjunction with known flocculating apparatus if subjected to the kind of operating conditions herein contemplated. With apparatus embodying the present improvements, large flows of water can thus be treated at a relatively low installation cost.

In the case of water softening treatment in the manner according to this invention the gritty material comprising the unburned and unreacted cores, may be said to represent recoverable material. Some of this reagent material does not slake as readily as its major portion which has gone into reaction. However, according to this embodiment, the segregated and separated gritty material may be returned to the influent end of the primary tank as by means of a recirculating pump. Such recirculating gives the segregated material renewed and sufficient opportunity for further reaction, so that the total amount of material slaked is increased and the reject losses of the reagent are minimized.

The water having been softened and flocculated in the primary unit or flocculation and degritting tank, and having yielded up the gritty component portion of the solids, may then be passed on to a secondary treatment stage, for instance a secondary sedimentation tank or other separating unit, in which the flocculated material is separated.

The treatment of water in the manner according to this invention may apply to the combined softening and flocculation treatment of hard water as just described, or it may also relate to the coagulating and flocculating treatment per se of a water which is not necessarily required to be softened.

(c)' In the treatment of sea water for effecting the recovery of magnesium therefrom, the water is dosed with a suitable precipitating reagent, for instance, lime or calcined dolomite. This precipitates the Ca (present and dissolved in the water as calcium bicarbonate ($Ca(HCO_3)_2$)) as calcium carbonate ($CaCO_3$) according to the following reaction:

(1)  $Ca(OH)_2 + Ca(HCO_3)_2 \rightarrow 2CaCO_3 + H_2O$

While the magnesium (present in the water for instance as magnesium chloride ($MgCl_2$)) is precipitated as magnesium hydroxide or hydrate ($Mg(OH)_2$) according to the following reaction:

(2)  $MgCl_2 + Ca(OH)_2 \rightarrow CaCl_2 + Mg(OH)_2$

Because of their respective solubilities the bulk of the calcium carbonate will precipitate in preference to the magnesium hydrate. However, assuming the precipitating reagent to be fed at an adequate rate, substantially all of the Ca as well as all of the Mg may be precipitated. The respective precipitates differ in their physical characteristics in that the calcium carbonate is of the heavier or readily settling kind, while the magnesium hydrate is of the lighter or flocculent kind, which may require flocculation treatment to properly condition it for sedimentation. The heavy and fast settling component portion of this precipitate mixture also includes particles or gritty material such as unburned cores of unreacted reagent material.

The separation of the heavy component portion and the condition of the flocculent portion with the use of known apparatus would require a separate unit for effecting grit removal ahead of a separate flocculating unit. However, with the use of treatment apparatus such as proposed by this invention, grit separation and flocculation treatment proceed simultaneously in the same or primary treatment tank while the mixture is in transit downwardly through the tank. The gritty portion settles on the bottom and is collected by the rotary raking mechanism, while rotary flocculating means structurally associated with or unitary with the raking means, condition or flocculate the Mg-hydrate.

The floc-carrying effluent liquid passes out through the central bottom outlet of this unit, while care is being taken that the grit withdrawal from the bottom remains functionally separate from the effluent outlet in the bottom of the tank. The further treatment, namely the sedimentation of the magnesium hydrate flocs, may take place after the liquid has been passed into the secondary treatment or settling tank by way of a transfer conduit such as shown for instance in Fig. 5, to lead from the bottom of the first to the bottom of the second tank unit.

Another mode of recovering the magnesium hydrate is to pretreat the sea water prior to its entry into the primary or coagulating unit A by dosing it with enough Ca-precipitating agent to remove most of the calcium in a preliminary treatment unit or precipitation station but substantially not the magnesia.

For example, a suitable apparatus for accomplishing this preliminary precipitating step is a machine in the United States of America, Patent No. 2,259,221 to Darby, Roberts and Weber. In this apparatus, the precipitant is added to the lower part of a treatment tank wherein flocculation takes place in a zone containing a blanket of suspended solids. The blanket rises to a level above a solids or sludge collecting pocket from which the precipitate is drawn off, while clarified effluent containing the yet unreacted magnesia overlies the sludge blanket and overflows from the upper section of the tank. In rising to the precipitate receiving pocket the liquid passes through a zone in which operates an assembly of stirring or flocculating paddles or blades.

The clarified effluent from this pretreatment unit still containing the still unprecipitated magnesia, is then further treated in a sequence of tank units A and B (see Fig. 3) or of units 51 and 52 (see Fig. 5). That is to say, the pretreated liquid (having been ridded of the bulk of its Ca) is further dosed with additional precipitating agent (such as lime or calcined dolomite) to effect the precipitation of magnesium hydrate which is at once subjected to flocculation treatment in the primary treatment unit A or 51 respectively. The magnesium hydrate flocs are carried with the effluent from the primary treatment unit over into the secondary treatment unit or settling tank B or 52 respectively where they settle out and are recovered in the form of underflow or sludge. While the reaction and flocculation proceed in the primary tank, any unreacted precipitating agent or unburned cores or gritty material that may have entered with the reagent material settle out directly in the primary tank as the gritty or fast settling fraction and is separately withdrawn and may be discarded. However, a quantity of the unreacted material thus recovered may be returned to the primary tank for further utilization of its reagent power.

(d)' In the recovery or treatment of flue dust from blast furnaces, the flue gases are scrubbed with water which thus becomes loaded up with a heavy portion of solids such as iron and other quick segregating matter, and a light or non-segregating portion comprising fine particles of carbon and others. As applied to the apparatus according to this invention, the heavy or primary sediment could be withdrawn from the primary tank unit, by means of a sludge pump and passed directly to a filter (not shown) for the recovery of the iron in the filter cake.

An alternative is to substitute a small classifier, for instance a rake classifier of the Dorr type instead of the filter, and to allow the overflow from this classifier to be recirculated to the feed end of the tank. Meanwhile, the non-segregating portion of the solids in the liquid is subjected to flocculation treatment as it passes downwardly through the primary tank unit. The floc-carrying liquid from which the heavy solids fraction has thus been abstracted, may then be further freed of the flocculated matter by sedimentation thereof in the secondary tank unit, the transfer of the liquid from the primary to the secondary tank being effected under conditions favorable to the preservation of the flocs in the liquid, namely by way of a transfer conduit leading from the bottom of the primary tank to the bottom of the secondary tank as exemplified in Fig. 5.

If the non-segregating matter of the flue dust in the water be thus subjected to flocculation, its subsequent sedimentation may be made possible without the previous addition of special coagulating agents. In this way a clarified effluent or clear water may be disposed of from the secondary unit without the risk of polluting a body of water into which it may be discharged.

It may be said that the improved apparatus of this invention will find a field of application and advantageous use wherever it is desired to dissolve, react, or precipitate solids or crystals in order to promote the formation of flocs and at the same time to segregate out the larger insoluble particles which in turn may be recirculated to the feed end of the tank for further dissolution and reaction, or may be sent to waste, as desired.

As regards the preservation of the flocs formed by establishing favorable transfer flow conditions as the liquid is being passed from the primary to the secondary tank unit, a practical structural arrangement applicable according to Fig. 5, permits the transfer of the floc-laden liquid from the bottom of the primary tank to the bottom of the secondary tank, that is along the most direct path of transfer, namely with a minimum of directional deviations or bends in the transfer path of the liquid.

Another embodiment (see Fig. 7) of the primary tank unit that serves the separation of the gritty from the non-gritty or flocculated matter, is similar with respect to its general structural layout to the embodiment shown in Fig. 6. However, it differs therefrom with respect to the disposition of the drive means for the rotary raking structure, and more paticularly differing with respect to certain adjustable effluent weir means at the tank bottom included in the Fig. 7 embodiment.

In Fig. 7 the tank unit, of which central portion only is shown, has a center pier structure 88 supporting a rotary structure 89 having raking blades 90 engaging settled gritty matter on the tank bottom 91, and having vertical upstanding flocculating paddle elements 92. There are also provided corresponding stationary vertical paddle elements 93 supported and depending from a superstructure or beam construction 94.

Means for mounting and driving the rotary structure 89 comprise an annular bearing or base portion 95 constituting the top portion of the pier structure 88, an internal ring gear 96 rotatable upon the stationary bearing portion 95 as indicated by anti-friction bearing balls 97. The internal toothed ring gear 96 is connected to the rotary structure 88 as at 96a, and is driven by a pinion 98 mounted on a vertical shaft 99 rotating in a stationary bearing portion represented by a cover portion 100 overlying the ring gear 96 and fixed as at 101 to the base portion 95. The cover portion 100 has mounted thereon drive gearing 102 for the pinion 98 and a drive motor 103.

There is also shown a central outlet portion 104 at the tank bottom through which non-gritty or flocculated matter passes downwardly from the tank, and a discharge pipe connection 105 therefor. The outlet portion 104 comprises an annular fixed portion 106 rising from the bottom, and vertically slidable in it is a cylindrical submerged weir portion or member 107 by means of which the effective height of the outlet relative to the tank bottom can be adjusted. The up and down adjustment of the member 107 can be effected by means of a vertical rod 108 connected with the cylindrical weir portion 107 as by means of a spider 109.

The actuating rod 108 has an upper threaded portion 110 extending through the base portion 95 and through the fixed cover portion 100. The rod is axially movable relative to the fixed base portion 95, but is secured against rotation relative thereto. A hand wheel 111 engages the threaded portion 110 and may be rotated to shift the rod 108 upwardly or downwardly and thereby raise or lower the effective height of the cylindrical submerged weir member 107.

As the rotary structure 89 is rotated, the gritty matter settled on the tank bottom is raked by the blades 90 towards the center of the tank and thus collected in a zone adjacent and surrounding the bottom outlet portion 104, where it is moved eventually in a sump 112 to be withdrawn through a discharge pipe 113.

Because of the partial showing of this tank unit in Fig. 7, feed inlet means to be provided marginally at the top of the tank, are not shown. But in a complete showing of this tank unit, such feed inlet means could, for example, be represented by the feed inlet means shown at 15 in Fig. 3 or at 69ª in Fig. 5.

I claim:

1. The method of treating liquids containing flocculatable as well as gritty solids in admixed suspension, which comprises maintaining a confined ever-changing body of such liquid in such quiescence that sedimentation of gritty solids takes place and forms an ever-changing accumulation of sediment in the bottom section of the liquid body, continually feeding liquid to be treated into the liquid body substantially at the top thereof, continually removing sediment from the accumulation thereof for controlling the sediment so that its accumulation does not normally reach above a predetermined height, continually agitating liquid in a zone in the body above that accumulation at a rate to minimize roiling of the sediment but sufficient to flocculate flocculatable suspended solids in that zone, and continually withdrawing floc-bearing liquid from an elevation in that zone that is above the height normally reached by the accumulation of sediment.

2. The method according to claim 1, in which the liquid that bears the flocs is withdrawn through a column of liquid outside of the tank that balances the liquid in the tank.

ARTHUR M. KIVARI.

REFERENCES CITED

The following references are of record in the file of this patent:

UNITED STATES PATENTS

| Number | Name | Date |
| --- | --- | --- |
| 2,259,221 | Darby et al. | Oct. 14, 1941 |
| 2,274,361 | Darby | Feb. 24, 1942 |
| Re. 20,971 | Darby | Jan. 10, 1939 |
| 1,762,585 | Pearl | June 10, 1930 |
| 1,938,894 | Darby et al. | Dec. 12, 1933 |
| 2,160,838 | Dorr | June 6, 1939 |
| 2,205,199 | Hubbell et al. | June 18, 1940 |
| 2,309,556 | Walker | Jan. 26, 1943 |
| 2,069,989 | Adams | Feb. 9, 1937 |
| 2,267,516 | Adams | Dec. 23, 1941 |
| 2,254,688 | Kuntz | Sept. 2, 1941 |
| 2,291,772 | Talbot et al. | Aug. 4, 1942 |
| 2,137,966 | Rankin | Nov. 22, 1938 |
| 2,089,160 | Darby | Aug. 3, 1937 |
| 2,101,810 | Fischer | Dec. 7, 1937 |
| 2,140,059 | Simonsen | Dec. 13, 1938 |
| 1,870,435 | Baker | Aug. 9, 1932 |
| 2,064,497 | Sayers | Dec. 15, 1936 |
| 1,237,745 | Blomfield | Aug. 21, 1917 |
| 1,752,789 | Downes | Apr. 1, 1930 |

FOREIGN PATENTS

| Number | Country | Date |
| --- | --- | --- |
| 472,180 | Great Britain | Sept. 30, 1937 |